United States Patent
Miller

(12) 
(10) Patent No.: US 6,620,451 B1
(45) Date of Patent: Sep. 16, 2003

(54) PREPARATION OF A RECOMBINED CREAM FORMULATION

(76) Inventor: Van Miller, P.O. Box #100, Noval, Ontario (CA), L0P 1A0

( * ) Notice: Subject to any disclaimer, the term of this patent is extended or adjusted under 35 U.S.C. 154(b) by 0 days.

(21) Appl. No.: 10/326,989

(22) Filed: Dec. 24, 2002

Related U.S. Application Data

(62) Division of application No. 10/163,575, filed on Jun. 7, 2002.
(51) Int. Cl.⁷ .................................................. A23C 13/00
(52) U.S. Cl. ........................ 426/586; 426/580; 426/662; 426/663; 426/664; 426/519; 426/522
(58) Field of Search ................................. 426/564, 565, 426/570, 580, 586, 662, 663, 664, 417, 490, 491, 519, 520, 521, 522

(56) References Cited

U.S. PATENT DOCUMENTS 3,505,077 A  *  4/1970  Bratland ..................... 426/570
5,487,913 A  *  1/1996  Fackrell et al. ............. 426/663

OTHER PUBLICATIONS

Melsen et al., Stability of recombined milk fat globules, Netherlands Milk and Dairy Journal, 1989, 43(1), 63–78.*

* cited by examiner

*Primary Examiner*—Leslie Wong
(74) *Attorney, Agent, or Firm*—Marks & Clerk

(57) ABSTRACT

A recombined cream formulation for use in the commercial manufacture of frozen cream-based sweet confections, contains from 45% to 55% by weight of butter which has from 78% to 85% by weight thereof of milk fat content; and from 45% to 55% by weight of a milk constituent which has from 0.0% to 0.5% by weight thereof of milk fat content, from 4.0% to 8.0% by weight thereof of MSNF content, and from 0.02% to 0.2% by weight of phospholipid content, which is primarily lecithin. Typically, the milk constituent is real buttermilk derived from a butter churn, but it may also be made from dried buttermilk powder; skim milk to which lecithin has been added; or rehydrated skim milk or rehydrated condensed skim milk, to which lecithin has been added.

12 Claims, No Drawings

PREPARATION OF A RECOMBINED CREAM FORMULATION

This application is a divisional of prior U.S. application No. 10/163,575, filed Jun. 7, 2002.

FIELD OF THE INVENTION

This invention relates to cream formulations, and particularly it relates to recombined cream formulations which may be used in the commercial manufacture of frozen cream-based sweet confections such as, particularly, ice cream. The present invention provides both a formulation and a method of making the same.

BACKGROUND OF THE INVENTION

The present invention lends itself particularly to the commercial production of frozen desserts such as ice cream. The recombined cream formulation of the present invention may also find utility in other frozen dessert products that are cream-based—such as soft ice cream toppings, bakery whips, and the like.

The history of ice cream is long, and colourful. It has been suggested that ice cream was introduced to Europe in 1295, when Marco Polo returned to Italy from the far east carrying a recipe for a frozen dessert that included milk. In 1813, Dolly Madison served ice cream at the Inaugural Ball of her husband, United States President James Madison. Commercial production of ice cream was begun in the United States in 1851, when a Baltimore milk dealer, Jacob Fussell, established an ice cream factory. The first commercial ice cream factory in Canada was established in 1893, in Toronto, by William Neilson.

The standards of the United States food and drug administration require the ice cream shall contain at least 10% milk fat by weight, and at least 9% of non-fat milk solids. Typically, ice cream will contain 10% to 16% by weight of fat and from 9% to 12% by weight of nonfat milk solids, together with 11% to 17% sucrose or equivalent for sweetness. Emulsifiers are used, such as egg yolk, and other stabilizers such as corn starch may also be employed. A principal constituent of ice cream is air. The presence of air means that ice cream has a lower specific gravity, or lower density, than the components from which it is made; and typically the increase in volume is referred to as overrun, and may be in the range of from about 80% for high quality products, up to about 200% for low priced, economy or "no name" ice cream products.

That is, a formulation to determine overrun such as the percent calculation of a measurement of the volume of the ice cream minus the volume of the mix divided by the volume of the mix, will result in a calculation showing overrun.

For example, 100 liters of an ice cream mix would make 180 liters of ice cream, with an overrun calculation of 80%.

Another calculation for overrun is made by determining the net weight of the mix minus the net weight of the product divided by the net weight of the product—when the net weight of the mix and the net weight of the product have been carefully determined in exactly the same volume—which again provides a calculation of overrun which is typically expressed in percentage.

For example, 500 ml of ice cream mix may weigh 550 g; and the weight of 500 ml of the manufactured ice cream might be 305.6 g. The difference in weight is 244.5 g; and it will be seen that the calculation of 244.5/305.6, expressed in percentage terms, gives an overrun value of 80%.

A typical formulation for vanilla ice cream might be as follows:

| | |
|---|---|
| 3.4% milk | 52.1% by weight |
| 30% cream | 27.3% by weight |
| NFDM milk | 3.9% by weight |
| granulated sugar | 16.1% by weight |
| stabilizer/emulsifier | 0.4% by weight |
| extract of vanilla | 0.2% by weight |

The milk fat contribution from the milk is 1.8% by weight, and of the cream is 8.2% by weight, giving a milk fat constituent of 10%. The MSNF component is provided by the milk (3.4%), by the cream (1.7%), and by the NFDM milk (3.8%); for a total MSNF constituent of 10%.

| | |
|---|---|
| Note: | MSNF means Milk Solids Not Fat.<br>NFDM means Non Fat Dry Milk. |

In commercial preparation of ice cream, the ice cream mix may be prepared in advance of the actual manufacture of the ice cream, including its freezing. Since ice cream is one of the food products for which a complete listing of the ingredients is not required on the package label, there may be considerable variance among ice cream mix formulations depending on their richness, their flavouring ingredients to some extent, and the source and reputation of the manufacture.

However, for consistency of ice cream production, and so as to comply with FDA and Canadian regulations and requirements—which are similar if not identical, in many respects—careful preparation of the ice cream formulation is necessary.

Because there is a tendency of hydrocolloids to form lumps, the use of such products as commercial stabilizers is such that the sugar and stabilizer may be dry blended before the formulation is mixed. However, stabilizers work best if they are permitted to hydrate in water for a short time before being added to a mix; and thus, sugar syrups work well for controlled hydration of stabilizers.

Typical stabilizers which are commercially employed include fermentation products such as xanthan, curdlan, and dextran; natural tree exudates and extracts such as gum arabic, gum karaya, and gum tragacanth; seed extracts such as algintas, agar, carrageenan, and furcellaran; plant and seed extract such as pectin, locust bean gum, and guar gum; and synthetic cellulose and derivatives of cellulose including carboxymethylcellulose and methylcellulose.

In ice cream formulations, the MSNF component contains the proteins (caseins and whey proteins), and the carbohydrates (lactose) which are found in milk.

Typically, 55% to 64% of the ice cream formulation is water, which comes from the milk constituent—usually skim milk.

Thus, typical commercial production of ice cream calls for a composition which includes: a concentrated source of milk fat, usually cream or butter; a concentrated MSNF component, usually evaporated skim milk or skim milk powder; sugars including sucrose and "glucose solids" which may be derived from the partial hydrolysis of corn starch; and milk.

The fat component adds richness of flavour, it contributes to a smooth texture of the ice cream, and lubrication to the palate as the ice cream is consumed. The MSNF component also contributes to the flavour, but particularly its purpose is to provide body and texture of ice cream by contributing body and enhancing the ability of the ice cream to hold air. Of course, sugars provide sweetness and palatability, and may enhance the perception of various fruit flavours if added. As well, sugars, which include the lactose from milk components, will contribute to a depressed freezing point so that the ice cream will, in fact, have some unfrozen water associated with it even at low temperatures in the range of −15° C. to −18° C. Otherwise, the ice cream is too hard to scoop.

Commercial manufacturers of ice cream have found it to be price advantageous—contributing to lower cost of production and therefore either to higher profits, lower market prices, or both—to use butter together with skim milk as the principal constituents of their ice cream formulations. In such circumstances, typically the butter is melted and introduced to a mixture of milk solids or condensed skim milk together with additional flavours, fruit, sugars, stabilizers, and so on.

However, it has been noted that there is a limitation to the amount of butter that can be added as a percentage of total fat in an ice cream formulation, because the cream may curdle due to a lack of inappropriate emulsifier in the formulation.

Accordingly, emulsifiers such as egg yolk may occasionally be used, especially in so-called French Vanilla ice creams and the like.

Of course, the use of lecithin—a naturally occurring phospholipid—as an emulsifier, is well known. However, when skim milk or condensed skim milk is employed in the production of commercialized cream, which is a common occurrence, there is very little, and usually no naturally occurring phospholipid present in the ice cream formulation because it has been removed during the preparation of the skim milk or condensed skim milk. Moreover, lecithin appears only in very small quantities, in butter; the lecithin becomes a component of churned buttermilk, which is a natural byproduct resulting from the production of butter. This is because, during the churning of sweet cream to manufacture butter, milk fat globule membranes are separated from the rest of the milk, and the milk fat globule membranes are rich in phospholipids, particularly lecithin. However, this situation is dependent upon the churning method which has been employed. For example, in modern continuous methods of churning, there is a more even distribution between the butter fat and the phospholipids in the buttermilk.

The use of buttermilk in the production of frozen dessert mixes has been considered. However, because buttermilk production is tied to the production of butter, seasonal cost, availability, and significant differences in the composition and quality of buttermilk, will occur. Moreover, it has been noted that the phospholipids that are carried in buttermilk solids are typically unsaturated, and thus their handling and processing must be very careful so as to avoid oxidation and therefore the creation of unacceptable flavour.

The present Inventor has, however, unexpectedly discovered that a recombined cream formulation may be prepared for use at a later time in the commercial manufacture of frozen cream-based sweet confections such as, particularly, ice cream. The recombined cream formulation of the present invention therefore employs buttermilk, or alternatively skim milk with additional lecithin added, but since the recombined cream formulation may be manufactured at a different time—and, indeed, in a different place—than where the commercial ice cream will be manufactured, then the previous shortcomings and difficulties that have been noted relative to the use of buttermilk in the production of frozen dessert mixes, is completely overcome.

In brief, the present Inventor has unexpectedly discovered that melted butter and/or butter oil can be recombined into a cream for use in the manufacture of ice cream, by suspending the melted butter and/or butter oil into buttermilk from a butter churn or skim milk to which phospholipid, particularly lecithin, has been added, so as to obtain the appropriate and proper emulsification of the butter during subsequent ice cream manufacture.

Of course, the recombined cream formulation of the present invention is processed including pasteurization and homogenization, whereby a superior cream for ice cream production is achieved.

Use of the recombined cream formulation of the present invention in the formulation of ice cream has resulted in superior whippability of the ice cream mix, with excellent overrun and the concomitant lowering of density and specific gravity of the ice cream mix when it is manufactured into ice cream.

It should be noted that store-bought buttermilk is not the same as real buttermilk, which is derived from a butter churn. Rather, store-bought buttermilk is a cultured skim milk, which has been acidified. Thus, the use of store-bought buttermilk is not contemplated by the present invention, and is contrary to the purposes and goals of the present invention.

SUMMARY OF THE INVENTION

Accordingly, the present invention provides a recombined cream formulation for use in the commercial manufacture of frozen cream-based sweet confections, where the cream formulation comprises butter and a milk constituent, where the milk constituent has a lecithin content.

Typically, the cream formulation comprises from 45% to 55% by weight of butter, and the butter itself has from 78% to 85% by weight of milk fat content.

The milk constituent is also present in the range of from 45% to 55% by weight; and a skim milk constituent itself has from 0.0% to 0.5% by weight thereof of milk fat content, from 4.0% to 8.0% by weight thereof of MSNF content, and from 0.02% to 0.2% by weight thereof of phospholipid content.

Ideally, the phospholipid content is in the range of from 0.1% to 0.16%.

Of course, it will be well known to those familiar with the dairy industry that the phospholipid content of the milk constituent is primarily lecithin.

The present invention provides that the milk constituent may be real buttermilk derived from a butter churn.

Otherwise, the milk constituent may be rehydrated buttermilk made from dried real buttermilk powder which has been derived from a butter churn, mixed with water.

Alternatively, the milk constituent may be skim milk to which the lecithin has been added.

Further, the milk constituent may be rehydrated skim milk which has been made from water and one of skim milk powder or condensed skim milk, and to which the lecithin has been added.

The present invention also provides a method for preparation of the recombined cream formulation which has been described immediately above. That method comprises the following steps:

(a) placing butter in the amount of from 45% to 55% by weight of the recombined cream formulation into a vessel, and melting the butter at a temperature of 45° C. to 75° C. The butter is as described above.

(b) warming a milk constituent in the amount from 45% to 55% by weight of the recombined cream formulation to a temperature of 35° C. to 75° C. The milk constituent is as described above, and contains from 0.02% to 0.2% by weight thereof of phospholipid.

(c) slowly adding the warmed milk constituent to the melted butter, so as to form a butter/milk mixture.

(d) maintaining the temperature of the butter/milk mixture at a temperature of 33° C. to 38° C. for a period of 30 minutes to 4 hours, while continually slowly agitating the butter/milk mixture.

(e) pasteurizing the butter/milk mixture at a temperature of 78° C. to 85° C. for a period of 25 seconds to 45 seconds.

(f) homogenizing the pasteurized butter/milk mixture at a temperature of 70° C. to 80° C. and a pressure of 600 psi to 1000 psi, so as to form a recombined cream formulation.

(g) cooling the recombined cream formulation to a temperature of 2° C. to 8° C., and storing the cooled recombined cream formulation for further use in the commercial manufacture of frozen cream-based sweet confections.

Typically, steps (a), (c), and (d) are carried out using a jacketed tank which is heated by hot water or stem.

Step (d) may be carried out for a period of 45 minutes to 115 minutes, in the general practice of the present invention.

Likewise, step (e) may be carried out at temperature of 80° C. to 82° C., for a period of 32 seconds to 38 seconds, in the general practice of the method of the present invention.

Typically, step (f) is carried out at a temperature of 72° C. to 78° C. and at a pressure of 850 psi to 950 psi, by passing the pasteurized butter/milk mixture through a single stage homogenizer.

It is usual that step (g) is carried out at a temperature of 3° C. to 6° C.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

As noted, the present invention provides for a recombined cream formulation that may be used in the commercial manufacture of frozen cream-based sweet confections. The recombined cream formulation is such that, once it has been manufactured, it may be stored at low temperature for extended periods of time, and it may be transported from one site to another.

The recombined cream formulation of the present invention allows for ice cream manufacture where curdling of the butter component thereof is essentially precluded because of the presence of a phospholipid as an emulsifier—the phospholipid being primarily lecithin.

The recombined cream formulation of the present invention may be employed in the commercial production of ice cream or other frozen cream-based sweet confections, simply by the appropriate addition of sugar or other sweeteners, vanilla, fruit, chocolate, or other flavouring and/or ripple additive, followed by the typical whipping and cooling operations. Tests have indicated excellent whippability and overrun capabilities.

Typically, butter or butter oil will have from 78% to 85% by weight thereof of milk fat content; and is present in the recombined cream formulation of the present invention in an amount of 45% to 55% by weight thereof.

The milk constituent of the present invention is particularly important, and is also present in the amount of from 45% to 55% by weight of the recombined cream formulation. The milk constituent will contain zero or very little milk fat content; a significant MSNF content, and a phospholipid—primarily lecithin—content.

As noted, the milk constituent may be real buttermilk which is derived from a butter churn; and notwithstanding the seasonal matters that otherwise might occur with respect to real buttermilk coming from a butter churn, just as butter may be stored so also may be the recombined cream formulation of the present invention. Accordingly, the seasonal aspect of buttermilk production may be avoided.

However, the milk constituent of the recombined cream formulation of the present invention may be rehydrated from a dried real buttermilk powder which has, itself, been derived from a butter chum, after it has been mixed with water. This also avoids the seasonality of the production of buttermilk.

Alternatively, as noted, skim milk or condensed skim milk may be employed as previously; however, in order to avoid the problem of curdling of butter during the manufacture of ice cream, as it has previously occurred, a phospholipid—particularly lecithin—is added to the skim milk constituent.

The general steps of the method of the present invention have been described above. Typically, the manufacture of the recombined cream formulation occurs by recombining butter with buttermilk, pasteurizing it and homogenizing it, after which it is cooled and stored for further use.

An example of a particular recombined cream formulation, and its production, now follows:

EXAMPLE 1

A batch of recombined cream formulation in keeping with the present invention was produced, having the following formulation:

| Formula | Batch (g) | Percent/Weight | Fat | MSNF |
|---|---|---|---|---|
| sweet butter (82.0% fat) | 2684.00 | 48.80 | 40.00 | 0.15 |
| buttermilk (7.9% to 8.1% total solids) | 2816.00 | 51.20 | | 4.70 |
| TOTAL | 5500.00 | 100.00 | 40.00 | 4.85 |

The butter was melted at 50° C. in a jacketed tank that was heated with hot water or steam.

At the same time, the buttermilk constituent to be used was heated to a temperature of about 35° C.

Thereafter, the buttermilk was added to te melted butter quite slowly, with medium agitation.

By warming the buttermilk constituent before adding it to the melted butter, any chance of butter fat crystal nucleii developing was precluded, so there was no risk of the butter constituent beginning to solidify or congeal as butter.

The temperature of the butter/milk mixture was noted as being approximately 35° C.

Then, the blend was permitted to hydrate at a controlled temperature of 33° C. to 35° C., for 1 hour.

The blend was then pasteurized at 81° C., for 35 seconds.

Following the pasteurization step the blend was homogenized at 75° C., and 900 psi, in a single stage homogenizer.

Finally, the homogenized recombined cream formulation was cooled to 4° C., filled into a suitable storage container, and stored for further use and/or analysis.

Analysis of the recombined cream formulation, after its manufacture as described above, showed that it comprised 41.0% fat and 46.32% total solids.

The viscosity of the recombined cream formulation, when it was first made, was measured at 10° C., spindle 12 at 60 Rpm, and was found to be 105 cps.

The following day, under the same conditions, the viscosity had increased to 112 cps.

Excellent whippability and overrun capabilities were then observed in the manufacturer of an ice cream whose formulation is otherwise the trade secret of the ice cream manufacturer, except to say that the ice cream as it was manufactured conformed to all FDA and Canadian regulations, and had the capacity to achieve the desired overrun.

It will be appreciated that the recombined cream formulation of the present invention may be employed easily in the commercial production of ice cream, with excellent ice cream production properties, at quite reasonable cost, and with a superior ice cream product being manufactured.

Of course, other variations and modifications to the recombined cream formulation in keeping with the present invention, and its method of production, will be evident to those skilled in the art, and may be employed without, however, departing form the spirit and scope of the present claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A method of preparation of a recombined cream formulation for use in the commercial manufacture of frozen cream-based sweet confections, comprising the steps of:

(a) placing butter in the amount of from 45% to 55% by weight of the recombined cream formulation into a vessel, and melting said butter at a temperature of 45° C. to 75° C., wherein said butter has from 78% to 85% by weight thereof of milk fat content;

(b) warming a milk constituent in the amount of from 45% to 55% by weight of the recombined cream formulation to a temperature of 35° C. to 75° C., wherein said milk constituent has from 0.0% to 0.5% by weight thereof of milk fat content, from 4.0% to 8.0% by weight thereof of MSNF content, and from 0.02% to 0.2% by weight thereof of phospholipid content;

(c) slowly adding said warmed milk constituent to said melted butter to form a butter/milk mixture;

(d) maintaining the temperature of said butter/milk mixture at a temperature of 33° C. to 38° C. for a period of 30 minutes to 4 hours, while continually slowly agitating the butter/milk mixture;

(e) pasteurizing the butter/milk mixture at a temperature of 78° C. to 85° C. for a period of 25 seconds to 45 seconds;

(f) homogenizing the pasteurized butter/milk mixture at a temperature of 70° C. to 80° C. and a pressure of 600 psi to 1000 psi to form a recombined cream formulation;

(g) cooling said recombined cream formulation to a temperature of 2° C. to 8° C., and storing said cooled recombined cream formulation for further use in the commercial manufacture of frozen cream-based sweet confections.

2. The method of claim 1, wherein the phospholipid content is in the range of from 0.1% to 0.16%.

3. The method of claim 1, wherein said phospholipid content of said milk constituent is primarily lecithin.

4. The method of claim 1, wherein steps (a), (c), and (d) are carried out using a jacketed tank heated by hot water or steam.

5. The method of claim 1, wherein step (d) is carried out for a period of 45 minutes to 115 minutes.

6. The method of claim 1, wherein step (e) is carried out at a temperature of 80° C. to 82 C. for a period of 32 seconds to 38 seconds.

7. The method of claim 1, wherein step (f) is carried out at a temperature of 72° C. to 78° C. and at a pressure of 850 psi to 950 psi , by passing said pasteurized butter/milk mixture through a single stage homogenizer.

8. The method of claim 1, wherein step (g) is carried out at a temperature of 3° C. to 6° C.

9. The method of claim 1, wherein said milk constituent is real buttermilk derived from a butter churn.

10. The method of claim 1, wherein said milk constituent is rehydrated buttermilk made from dried buttermilk powder which has been derived from a butter churn, mixed with water.

11. The method of claim 1, wherein said milk constituent is skim milk to which lecithin has been added.

12. The method of claim 2, wherein said milk constituent is rehydrated skim milk made from water and one of the group consisting of skim milk powder and condensed skim milk, to which lecithin has been added.

\* \* \* \* \*